US009497270B2

(12) United States Patent
Burch et al.

(10) Patent No.: US 9,497,270 B2
(45) Date of Patent: Nov. 15, 2016

(54) FEDERATED TIMEOUT (75) Inventors: Lloyd Leon Burch, Payson, UT (US);
Baha Masoud, Orem, UT (US);
Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 594 days.

(21) Appl. No.: 13/599,718

(22) Filed: Aug. 30, 2012

(65) Prior Publication Data
US 2014/0068094 A1    Mar. 6, 2014

(51) Int. Cl.
G06F 15/16 (2006.01)
H04L 29/08 (2006.01)

(52) U.S. Cl.
CPC ..................... H04L 67/14 (2013.01)

(58) Field of Classification Search
USPC .................................. 709/227–228
See application file for complete search history.

(56) References Cited

U.S. PATENT DOCUMENTS

| | | | |
|---|---|---|---|
| 5,978,939 A | | 11/1999 | Mizoguchi et al. |
| 6,820,122 B1* | | 11/2004 | Mandler ............... G06F 9/52 707/999.202 |
| 7,100,195 B1* | | 8/2006 | Underwood ............... 726/2 |
| 7,111,323 B1 | | 9/2006 | Bhatia et al. |
| 7,418,615 B2 | | 8/2008 | Chang et al. |
| 7,493,394 B2 | | 2/2009 | Zavalkovsky et al. |
| 7,653,828 B2 | | 1/2010 | Kostadinov et al. |
| 8,214,492 B2* | | 7/2012 | Chauvin et al. ............... 709/224 |
| 8,239,871 B2 | | 8/2012 | Ogasawara |
| 8,352,610 B2* | | 1/2013 | Silva-Lepe ........... G06F 9/5055 370/235 |
| 8,875,243 B1* | | 10/2014 | Cherukumudi et al. ......... 726/4 |
| 8,881,172 B2* | | 11/2014 | Schneider ..................... 719/318 |
| 2005/0187809 A1* | | 8/2005 | Falkenhainer ... G06Q 10/06311 705/7.13 |
| 2005/0193269 A1* | | 9/2005 | Haswell et al. ................ 714/38 |
| 2006/0218625 A1* | | 9/2006 | Pearson et al. .................... 726/4 |
| 2007/0067444 A1* | | 3/2007 | McCarty et al. ............. 709/224 |
| 2007/0143829 A1* | | 6/2007 | Hinton et al. ..................... 726/5 |
| 2007/0255716 A1* | | 11/2007 | Sabev .................. G06F 9/4825 |
| 2010/0042718 A1* | | 2/2010 | Morris ......................... 709/224 |
| 2010/0153397 A1* | | 6/2010 | Barabas et al. ................ 707/737 |
| 2011/0270850 A1* | | 11/2011 | Wana et al. ................... 707/749 |
| 2011/0320544 A1* | | 12/2011 | Yee et al. ..................... 709/206 |
| 2012/0323786 A1* | | 12/2012 | Kirsch ............................ 705/44 |
| 2012/0324242 A1* | | 12/2012 | Kirsch ........................... 713/189 |
| 2014/0214759 A1* | | 7/2014 | Williams et al. ............. 707/608 |

\* cited by examiner

Primary Examiner — Abdullahi E Salad
(74) Attorney, Agent, or Firm — Schwegman Lundberg & Woessner, P.A.

(57) ABSTRACT

Techniques for workload federated timeout are presented. A federated service manages communications between service components of a system. Each component queries the federated service to determine a last activity time by the other components of the system before timing out during a session. Each component can update its last activity time based on the discovered last activity time of one of the components to prevent a premature time out from the session.

20 Claims, 4 Drawing Sheets

FEDERATED TIMEOUT

BACKGROUND

Remote access to services over the Internet has provided consumers with access to theft desired services from virtually any location 24 hours a day and 365 days a year. Additionally, the service providers often outsource many of theft features to other remote third-party providers. In fact, the location of any particular service and the provider(s) of that service have now become transparent issues that are of little concern to end users. Users can also now access these remote services from mobile devices, such as phones, from even the remotest of geographical locations.

One problem with omnipresent access to services that may be provided from all over the globe is security. Of particular concern is the time lapse during which no activity is detected on the part of the user when accessing a service. Another problem associated with inactivity is that if the user is truly done accessing a service then unnecessary resources are being consumed by the service providers in keeping a user's session active.

In fact, it is a common security practice to use a setting called activity timeout to help secure systems against unauthorized tampering and to free up system resources by closing the users session if there is no activity for some configurable period of time. Use of timeout settings is critical for web-based solutions because many times the user does not "log out;" he/she just close his/her browser application. While most web-based solutions routinely set inactivity timeouts, this is usually accomplished using the "container timeout" in products such as Tomcat.

Many customer solutions built today are complete user solutions that include many component services existing in different containers, which may run on many computers from a variety of locations. For maximum usability, the end user should not be aware of the fragmented nature of the solution. Authentication can be performed via federation so the user continues to experience a true single sign on experience.

In a federated authentication system, each service component receives an authentication token, such as a Security Assertion Markup Language (SAML) token, and uses that token to build its own session. This means that if a solution has 4 service components there could be up to 5 sessions in 5 containers on 5 servers; one for the identity provider (the token builder) and one for each of the service components (the token consumer). However, each component service times out at a different rate across the multi-component system. Furthermore, a single service component can only know about its own activity and not the activity of other service components within the overall system. So, components services time out at different rates across a multi-component system. This means that one service component of a customer solution can time out while another service component is active with the customer, creating: system instability, poor integration, and customer solution failure. Synchronization of per-system activity timeouts across multi-component service solutions become problematic as more and more of these complex software and information services move to the web and to virtual environments (which as discussed above they are).

SUMMARY

Various embodiments of the invention provide techniques for federating timeouts. In an embodiment a method for managing a federated timeout is presented.

Specifically and in an embodiment, a last-recorded activity time is maintained for a session, which reflects an up-to-date time for a most recent activity occurring in the session between a principal and second principals. The last-recorded activity time is dynamically communicated to a requesting principal before the requesting principal times out the session due to inactivity for a predefined amount of time as noted by the requesting principal.

DETAILED DESCRIPTION

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "service provider" as discussed herein refers to a network-based service that may or may not be part of an overall system, and which provides some feature or function to a principal (which may itself be a service or which may be an end user). Moreover, the phrase "service component" may be used interchangeably and synonymously herein with the phrase "service provider."

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Figure 1:
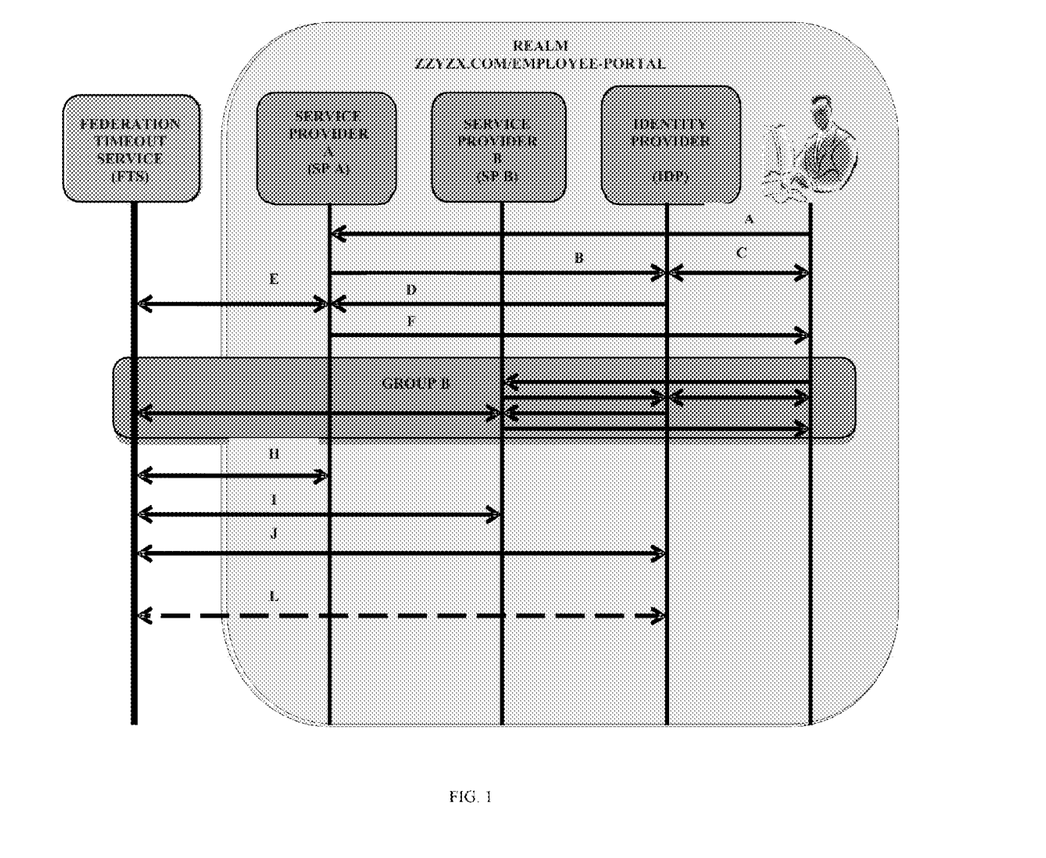
FIG. 1 is a diagram depicting a technique for managing a federated timeout, according to the techniques presented herein.

FIG. 1 is a diagram depicting a technique for managing a federated timeout, according to the techniques presented herein. It is noted that the FIG. 1 is presented for purposes of illustration and comprehension. It is to be understood that other arrangements and/or components can be used to achieve the teachings presented herein and below.

The components of the FIG. 1 are implemented in non-transitory and processor-readable storage medium and are executed on physical processors on one or more networks. Each processor specifically configured to execute the components.

The techniques herein solve the timeout problems discussed above by creating a "Federated Timeout Service" (FTS). The FTS provides the ability to securely update activity from a service component and allows other service components to securely query the activity of the other components. Activity information can be shared between any web service that has the required tokens or credentials. This information can then be used to update session life based on activity from another federated service.

The techniques taught herein and below are described within the context of an example use-case scenario. It is to be noted that the various embodiments of the invention are not to be restricted to the use-case scenario as others are foreseeable as well without departing from the provided teachings. The scenario described below (and within the context of the FIG. 1) starts with an example of standard SAML federated authentication and begins with the user, John:

Event A—John accesses Service Provider A (SPA) with a browser.

Event B—John is routed to the Identity Provider (IDP) that is trusted by the SPA.

Event C—John is authenticated by the IDP. This authentication can be done via a cookie from a previous authentication, Name and Password, SAML, Kerberos, NTLM (Windows® NT Local Area Network (LAN) Manager—NTLM) or any other accepted authentication mechanism.

Event D—Once authentication is complete, the SAML token is sent to the SPA.

The token returned can contain information about the user's identity.

The token generated by the IDP and sent to the SPA in event D contains new fields to allow it to interact with the FTS.

Here are the fields that are contained in the SAML assertion:

1) IDP Activity Reporting domain Uniform Resource Locator (URL)—This is the domain to which the IDP reports its activity. This can be a multivalued field allowing the IDP to update more than one domain (e.g., ZZYZX.COM/Employee-Portal).

Preferred—This is used to mark the domain as the preferred domain the IDP wants others to use.

Authentication token—This authentication token can be used to authenticate to the FTS.

Type—SAML, Name Password, Ticket or other formats.

Value—The secret to use for authentication.

2) Checked Activity Domain URL—This is the realm that the IDP checks for other activity occurring before timing out. This can be a multivalued field (e.g., ZZYZX.COM/Employee-Portal) and may be the same as the IDP Activity Reporting domain URL.

Preferred—This is used to mark the domain as the preferred domain the IDP wants others to use.

Authentication token—This authentication token can be used to authenticate to the FTS.

Type—SAML, Name Password, Ticket or other formats.

Value—The secret to use for authentication.

3) User Session ID—This is unique identifier for each user login.

4) User ID—This is a unique user identifier.

The information described above that is contained in the "Authentication Token" is used to interact with the FTS and enables a secure connection. It can be obtained in a few ways:

1) The IDP queries the FTS (Event L) to obtain a type and value pair to send to the SPA.

2) The IDP can know the secrets and send them to the SPA.

3) The IDP can build a SAML or other token and send it to the SPA.

4) The IFP can build a restricted SAML or other token that the SPA is instructed to sign.

5) The IDP can do nothing, leaving the SPA to know, sign, or build its own token or password.

Once the SPA has validated the SAML token it uses the information above to update the FTS with session activity. In this example REpresentational State Transfer (REST) is used but other mechanisms can be used as well including Simple Access Protocol (SOAP), Hyper-Text Transfer Protocol (HTTP, WS-Trust, carrier pigeon, etc.). The connection from the FTS is authenticated using the information from the IDP, authentication secrets, or the trust relationship that it has with the FTS.

Event E—A REST call to the FTS is made to the URL, using the information given by the IDP including the User Session ID and other data to indicate the time of its last activity.

The response from the FTS is an update of the most recent time of any activity by other validated services. The SPA uses this data to update its activity timeout. An example in REST may look like this:

"zzyzx.com/Employee-Portal/Update/UserID/UserSessionID/TimeNow."

At this point, John may now access and use the service from the SPA that he requested.

Event G—The flow illustrated is the same as above but is with the SPB in place of the SPA.

Events H, I and J—The flows shown in (H), (I), and (J) happens at intervals of time to update the time-out. If any activity has occurred at that service point that is newer than what is at the FTS, then the FTS is updated.

If the time at the FTS is newer, then the new time is returned to the service, and the service updates its time out.

If any one of the services or the IDP itself is about to time out because of no activity, the service about to time out makes a call to the FTS via Events H-J with that service's last activity time and if there is other activity time returned it will update its time out and not time out. If there is no other activity it times out and kills its session.

Any service or the IDP can also make a call to the FTS to logout of the session on the FTS. When this is done, all other calls to the FTS receive a "timed out" response when they update or query the FTS.

The FIG. 1 shows a specific interaction for the techniques presented herein and well as the timing of those interactions. The FIGS. that follow expand on these mechanisms.

Figure 2:
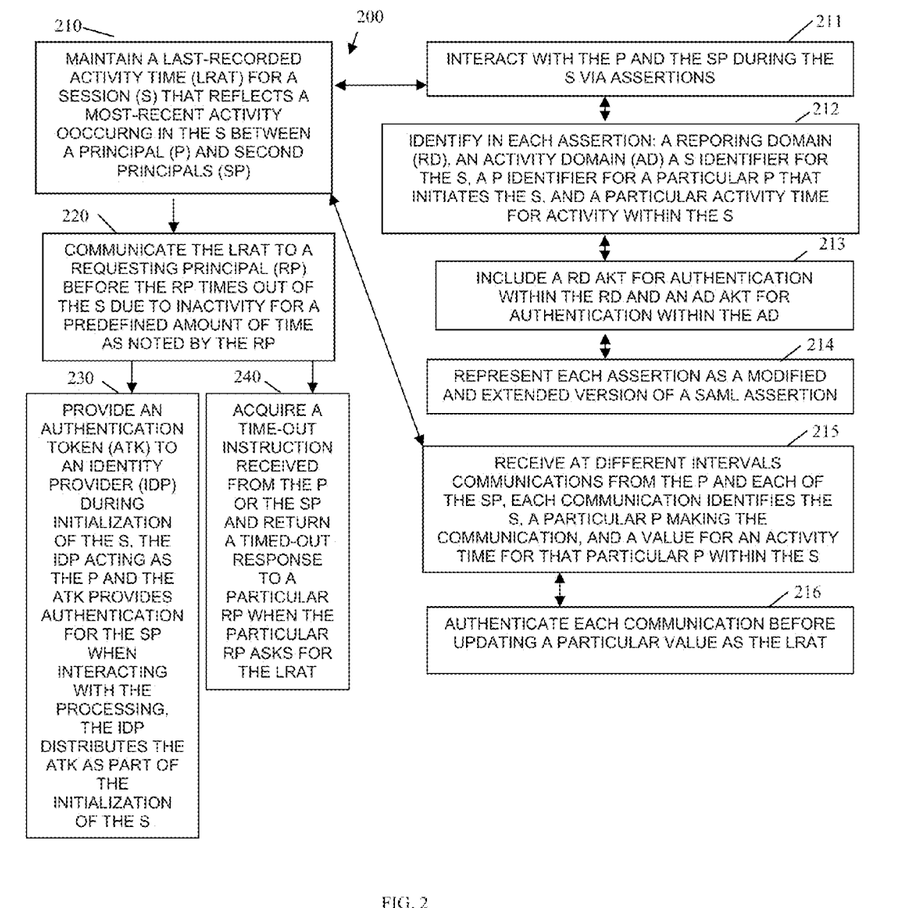
FIG. 2 is a diagram of a method for a federated timeout, according to embodiments presented herein.

FIG. 2 is a diagram of a method 200 for a federated timeout, according to embodiments presented herein. The method 200 (herein referred to as "federated timeout controller") is implemented, programmed, and resides within a non-transitory machine-readable storage medium that executes on one or more processors of a network. The network may be wired, wireless, or a combination of wired and wireless.

The FIG. 2 presents the processing from the perspective of the FTS (discussed above with reference to the FIG. 1).

At 210, the federated timeout controller maintains a last recorded activity time for a session reflecting an up-to-date time for a most-recent activity occurring in the session between a principal and second principals. Here, the principal may be viewed as an identity provider, or in some instances an end user and the second principals may be viewed as services that comprise a network-based service that the identity provider and user are engaged in during the session. Also, the establishment of the session and the initial authentication of the principals to one another were discussed above in detail with reference to the FIG. 1.

According to an embodiment, at 211, the federated timeout controller interacts with the principal and the second principals during the session via or using assertions.

Continuing with the embodiment of 211 and at 212, the federated timeout controller identifying in each assertion: a reporting domain, an activity domain, a session identifier for the session, a principal identifier for a particular one of the principals that initiates the session, and a particular activity time for activity within the session. The details and format of these elements within the assertion and variations were presented above in detail with reference to the FIG. 1.

Still continuing with the embodiment of 212 and at 213, the federated timeout controller includes a reporting domain authentication token for authentication with the reporting domain and an activity domain authentication token for authentication with the activity domain. Again, the structure and variations of the authentication tokens were presented above in detail with reference to the FIG. 1.

Continuing with the embodiment of 213 and at 214, the federated timeout controller represents each assertion as a modified and extended version of a SAML assertion. Thus, new fields can be used as discussed above with reference to the FIG. 1.

In an embodiment, at 215, the federated timeout controller receives at different intervals communications from the principal and each of the second principals. Each communication identifies the session (via the session identifier), a particular principal (via a principal identifier or user identifier (user being a type of principal)—can also be an identity for the principal) making the communication, and a value for an activity time for that particular principal within the session.

Continuing with the embodiment of 215 and at 216, the federated timeout controller authenticates each communication before updating a particular value as the last-recorded activity time.

At 220, the federated timeout controller communicates the last-recorded activity time to a requesting principal before the requesting principal times out of the session due to inactivity for a predefined amount of time as noted by the requesting principal. That is, each requesting principal engaged in the session dynamically queries the federated timeout controller before that requesting principal times out of the session for the last-recorded activity time noted by the federated timeout controller. So, as was discussed above with reference to the FIG. 1, a principal that is about to time out because that principal has last had activity that warrants a time out (based on a session-defined policy for a length of inactivity time) will not time out when the federated timeout controller reports an activity time from another principal in the session that is less than the session-defined policy length. Such principal updates its own activity time to comport with the time reported by the federated timeout controller.

According to an embodiment, at 230, the federated timeout controller provides an authentication token to an identity provider that is acting as the principal for the session. The authentication token provides an authentication mechanism for the principal and for the second principals when interacting with the federated timeout controller (the method 200). Moreover, the identity provider distributes the authentication token to the second principals as part of the session initialization processing.

In an embodiment, at 240, the federated timeout controller acquires a time out instruction that is received from the principal or one of the second principals. In response, the federated timeout controller returns a timed-out response to any particular requesting principals when those requesting principals asks for the last-recorded activity time being maintained and managed by the federated timeout controller.

Figure 3:
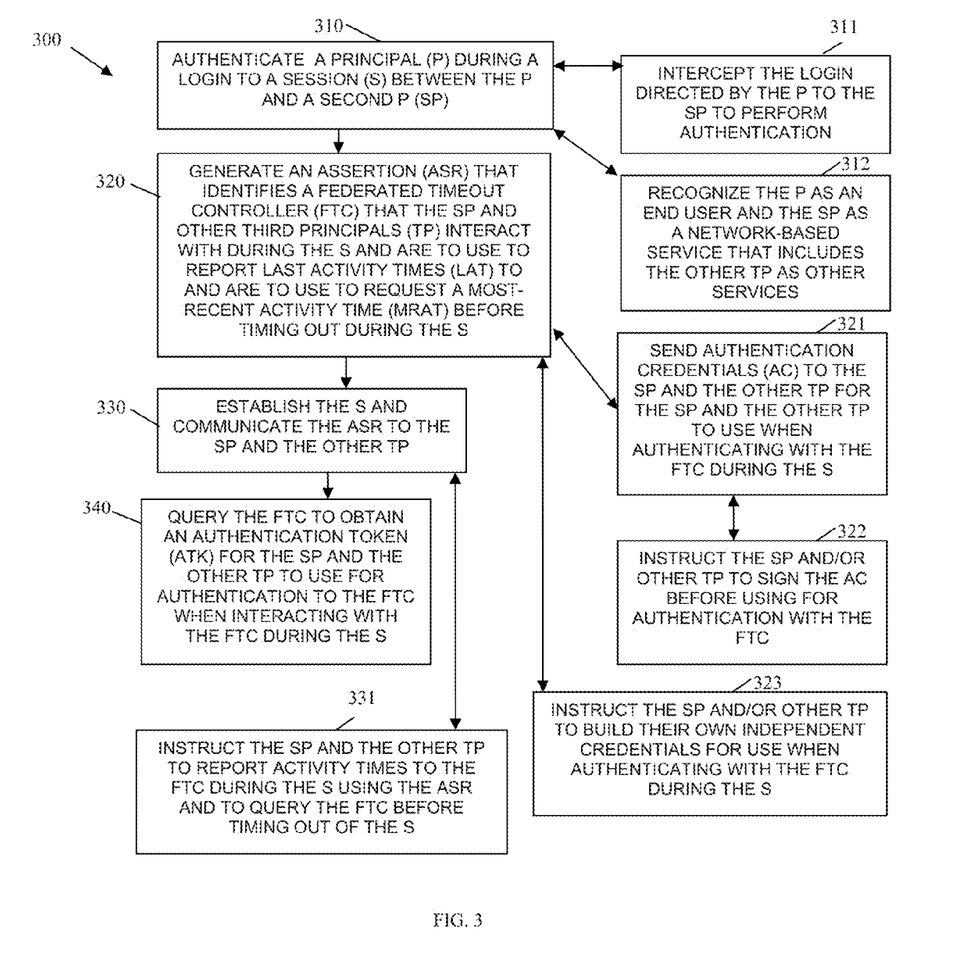
FIG. 3 is a diagram of another method for a federated timeout, according to embodiments presented herein.

FIG. 3 is a diagram of another method 300 for a federated timeout, according to embodiments presented herein. The method 300 (herein after referred to as "identity provider") is implemented, programmed, and resides within a non-transitory machine-readable storage medium that executes on one or more processors of a network. The network may be wired, wireless, or a combination of wired and wireless.

The identity provider is one type of principal that participates in a communication session; the identity provider interacts with the principals of the session and the FTS in the manners discussed above with reference to the FIGS. 1 and 2 and as additionally described below with reference to the processing of the FIG. 3.

At 310, the identity provider authenticates a principal during login to a session between the principal and a second principal. It is noted that the identity provider is also a participant in the session.

According to an embodiment, at 311, the identity provider intercepts the login directed by the principal to the second principal to perform the authentication. So, the identity provider may be operating as a transparent proxy to at least the principal. Some approaches to achieving this interception were discussed above with reference to the FIG. 1, which discusses and uses browser redirection.

In an embodiment, at 312, the identity provider recognizes the principal as an end user and the second principal as a network-based service that includes other third-principals as other services that are part of or available to the second principal (network-based service).

At 320, the identity provider generates an assertion that identifies a federated timeout controller, which the second principal and other third principals interact with during the session. The second principal and the other third principals use the federated timeout controller to report last activity times to and use the federated timeout controller to request a most-recent activity time before timing out during the session.

According to an embodiment, at 321, the identity provider sends authentication credentials to the second principal and/or the other third principals for the second principal and/or other third principals to use when authenticating with the federated timeout controller during the session. This scenario was discussed at length above with reference to the FIG. 1.

Continuing with the embodiment of 321 and at 322 the identity provider instructs the second principal and/or the other third principals to sign the authentication credentials before those credentials for authentication with the federated timeout controller.

In another case, at 323, the identity provider instructs the second principal and/or other third principals to build their own independent credentials for use when authenticating with the federated timeout controller during the session.

At 330, the identity provider establishes the session and communicates the assertion to the second principal and the other third principals.

According to an embodiment, at 331, the identity provider instructs the second principal and/or the other third principals to report activity times to the federated timeout controller during the session using the assertion and to also query the federated timeout controller before timing out of the session.

In an embodiment, at 340, the identity provider queries the federated timeout controller to obtain an authentication token for the second principal and/or the other third principals to use for authentication to the federated timeout controller when interacting with the federated timeout controller during the session.

Figure 4:
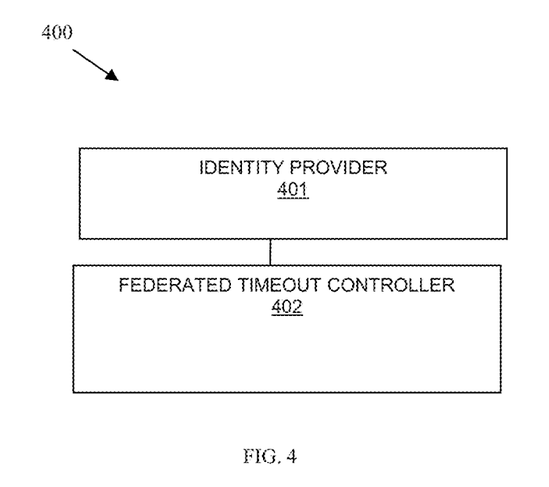
FIG. 4 is a diagram of a federated timeout system, according to embodiments presented herein.

FIG. 4 is a diagram of a federated timeout system 400, according to embodiments presented herein. The components of the federated timeout system 400 are implemented, programmed, and reside within a non-transitory machine-readable storage medium that executes on one or more processors of a network. The network may be wired, wireless, or a combination of wired and wireless.

In an embodiment, the federated timeout system 400 implements, inter alia, the processing associated with the methods 200 and 300 of the FIGS. 2 and 3, respectively and the processing associated with the FIG. 1.

The federated timeout system 400 includes an identity provider 401 and a federated timeout controller 402. Each of these and their interactions with one another will now be discussed in turn.

The federated timeout system 400 includes a first processing device that includes the identity provider 401, which is programmed within memory of the first processing device and/or that is implemented and resides within a non-transitory computer-readable storage medium as executable instructions that execute on the first processing device. Example processing associated with the identity provider 401 was presented above in detail with reference to the FIGS. 1 and 3.

The identity provider 401 is configured to configure the principals to report activity times to the federated timeout controller 402 during a session. Moreover, the identity provider 401 is configured to principals to check for a most-recent activity time with the federated timeout controller 402 before timing out the session. Again, it is to be noted that the principals can include an end user that establishes the session and the services to which the end user is going to communicate with during that session. As was noted above as well, the identity provider 401 may also be considered as a type of principal. For that matter, the federated timeout controller 402 may also be considered as a type of principal. Furthermore, the principal establishing the session does not have to be an end user as in some instances the principal is an automated service.

The identity provider 401 is also configured to authenticate the principals to establish the session. This was discussed in detail above with reference to the FIGS. 1 and 3.

The identity provider 401 is further configured to configure the principals for authentication with the federated timeout controller 402 during interactions of the principals with the federated timeout controller 402.

The federated timeout system 400 also includes a second processing device that includes the federated timeout controller 402, which is programmed within memory of the second processing device and/or that is implemented and resides within a non-transitory computer-readable storage medium as executable instructions that execute on the second processing device. Example processing associated with the federated timeout controller 402 was presented above in detail with reference to the FIGS. 1 and 2.

The federated timeout controller 402 is configured to maintain the most-recent activity time for the principals (for the session that the principals are engaged in). Moreover, the federated timeout controller 402 is configured to dynamically deliver the most-recent activity time upon request received from one of the principals (requesting principal) during the session.

It is also be noted that the first and second devices may each be (or just one of them) a Virtual Machine (VM), such that the two devices are both part of a same physical machine or same machine architecture. In other cases, the devices may be on different physical machines and in some cases may even be remote from one another across a wide-area network (WAN) accessible via the Internet for communication with one another.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by a machine configured to perform the method, comprising:
   maintaining, at the machine, a last-recorded activity time for a session reflecting an up-to-date time for a most recent activity occurring in the session between a principal and second principals, wherein maintaining further includes obtaining the most recent activity from a domain identified in a token with the principal and the second principals configured for reporting session activity to that domain; and
   communicating, at the machine, the last-recorded activity time to a requesting principal before the requesting principal times out of the session due to that requesting principal's inactivity for a predefined amount of time within the session and the predefined amount of time for the inactivity is provided from the requesting principal as a dynamic query that is initiated from the requesting principal for the last-recorded activity time before that requesting principal times out of the session, and wherein updating, by the requesting principal, a principal maintained last activity time maintained by the requesting principal with the last-recorded activity time, wherein each principal updates that principal's individually maintained last activity time with the last-recorded activity time communicated and wherein none of the principals is permitted to time out of the session when at least one of the principals has a particular maintained last activity time that has not exceeded the predefined amount of time of inactivity.

2. The method of claim 1 further comprising, providing, by the machine, an authentication token, to an identity provider during initialization of the session, the identity provider acting as the principal in the session and the authentication token provides authentication for the second principals when interacting with the method, the identity provider distributes the authentication token to the second principals as part of the initialization of the session.

3. The method of claim 1 further comprising, acquiring, at the machine, a time-out instruction received from the principal or one of the second principals and returning a timed-out response to a particular requesting principal when the particular requesting principal asks for the last-recorded activity time.

4. The method of claim 1, wherein maintaining further includes interacting with the principal and the second principals during the session via assertions.

5. The method of claim 4, wherein interacting further includes identifying in each assertion: a reporting domain, an activity domain, a session identifier for the session, a principal identifier for a particular principal that initiates the session, and a particular activity time for activity within the session.

6. The method of claim 5, wherein identifying further includes including a reporting domain authentication token for authentication within the reporting domain and an activity domain authentication token for authentication with the activity domain.

7. The method of claim 6, wherein identifying further includes representing each assertion as a modified and extended version of a Security Assertion Markup Language (SAML) assertion.

8. The method of claim 1, wherein maintaining further includes receiving at different intervals communications from the principal and each of the second principals, each communication identifying the session, a particular principal making the communication, and a value for an activity time for that particular principal within the session.

9. The method of claim 8, wherein receiving further includes authenticating each communication before updating a particular value as the last-recorded activity time.

10. A method implemented in a non-transitory machine-readable storage medium and processed by a machine configured to perform the method, comprising:
authenticating, at the machine, a principal during a login to a session between the principal and a second principal and providing the principal and the second principal with a domain for reporting session activity;
generating, at the machine, an assertion, the assertion identifying a federated timeout controller that the second principal and other third principals interact with during the session and last activity times for the session reported by the principal, the second principal, and the other third principals on the domain and the principal, the second principal, and the other third principals request a most-recent activity time for the session from the federated timeout controller before timing out during the session, and wherein generating further includes dynamically querying, by the principals, the federated timeout controller for obtaining the most-recent activity time, and updating, by the principals local most-recent activity times maintained by the principals with the most-recent activity time, wherein each principal updates that principal's local most-recent activity time with the most-recent activity time and none of the principals are permitted to timeout of the session unless all of the local most-recent activity times being individually updated by the principals with the most-recent activity time, as provided by the federated controller, exceed a predefined amount of time of inactivity for the session;
establishing, from the machine, the session and communicating the assertion to the second principal and the other third principals.

11. The method of claim 10 further comprising, querying, from the machine, the federated timeout controller to obtain an authentication token for the second principal and the other third principals to use for authentication to the federated timeout controller when interacting with the federated timeout controller during the session.

12. The method of claim 10, wherein authenticating further includes intercepting the login directed by the principal to the second principal to perform the authentication.

13. The method of claim 10, wherein authentication further includes recognizing the principal as an end user and the second principal as a network-based service that includes the other third-principals as other services.

14. The method of claim 10, wherein generating further includes sending authentication credentials to the second principal and the other third principals for the second principal and the other third principals to use when authenticating with the federated timeout controller during the session.

15. The method of claim 14, wherein sending further includes instructing the second principal and/or the other third principals to sign the authentication principals before using for authentication with the federated timeout controller.

16. The method of claim 10, wherein generating further includes instructing the second principal and/or the other third principals to build their own independent credentials for use when authenticating with the federated timeout controller during the session.

17. The method of claim 10, wherein establishing further includes instructing the second principal and the other third principals to report activity times to the federated timeout controller during the session using the assertion and to query the federated timeout controller before timing out of the session.

18. A system, comprising:
a first processing device having an identity provider implemented and residing as instructions within a non-transitory computer-readable storage medium that processes on the first processing device; and
a second processing device having a federated timeout controller implemented and residing as instructions within a non-transitory computer-readable storage medium that processes on the second processing device;

wherein the identity provider is configured to configure principals to report activity times to the federated timeout controller though a domain monitored by the federated timeout controller during a session and to configure the principals for dynamically querying the federated timeout controller for a most-recent activity time and the principals to update local most-recent activity times being individually maintained by the principals with the most-recent activity time before making a decision to time out of the session, wherein each principal updates that principal's individually maintained activity time with the most-recent activity time provided by the federated timeout controller, the federated timeout controller is configured to maintain the most-recent activity time for the principals and deliver the most-recent activity time upon request from one of the principals during the session when that requesting principal attempts to time out of the session, and wherein none of the principals are permitted to time out of the session when at least one principal has activity within the session within a predefined period of time that has not exceeded the most-recent activity time managed by the federated timeout controller.

19. The system of claim 18, wherein the identity provider is also configured to authenticate the principals to establish the session.

20. The system of claim 18, wherein the identity provider is further configured to configure the principals for authentication with the federated timeout controller during interactions of the principals with the federated timeout controller during the session.

\* \* \* \* \*